(12) United States Patent
Kadambi et al.

(10) Patent No.: US 7,853,601 B2
(45) Date of Patent: Dec. 14, 2010

(54) METHOD FOR ASSOCIATING ADVERTISEMENTS WITH RELEVANT CONTENT

(75) Inventors: Jayant Kadambi, Mountain view, CA (US); Ayyappan Sankaran, San Jose, CA (US)

(73) Assignee: Yume, Inc., Redwood City, CA (US)

( * ) Notice: Subject to any disclaimer, the term of this patent is extended or adjusted under 35 U.S.C. 154(b) by 446 days.

(21) Appl. No.: 11/964,725

(22) Filed: Dec. 27, 2007

(65) Prior Publication Data

US 2009/0132507 A1    May 21, 2009

Related U.S. Application Data

(60) Provisional application No. 60/883,822, filed on Nov. 19, 2007.

(51) Int. Cl.
*G06F 17/30* (2006.01)
*G06F 7/04* (2006.01)
(52) U.S. Cl. ........................................ 707/749; 707/809
(58) Field of Classification Search ...................... 707/4, 707/999.004, 737, 740, 749, 809
See application file for complete search history.

(56) References Cited

U.S. PATENT DOCUMENTS

| | | | |
|---|---|---|---|
| 2004/0199497 A1* | 10/2004 | Timmons | 707/3 |
| 2007/0121651 A1* | 5/2007 | Casey et al. | 370/401 |
| 2008/0046415 A1* | 2/2008 | Henkin et al. | 707/3 |
| 2008/0147788 A1* | 6/2008 | Omoigui | 709/203 |

\* cited by examiner

*Primary Examiner*—James Trujillo
*Assistant Examiner*—Bruce M Moser
(74) *Attorney, Agent, or Firm*—Lau & Associates, LLC.

(57) ABSTRACT

The present invention provides method and system for associating an advertisement with one or more content on Internet. The method comprising gathering one or more feeds associated with the one or more content from a plurality of content. The method further comprises categorizing the one or more content into at least one general web-based category belonging to a set of general web-based categories based on the one or more feeds. Thereafter, the set of general web-based categories is translated to a set of pre-defined categories, such that one or more general web-based categories are translated to a pre-defined category. Finally, the advertisement is associated with the one or more content in one or more pre-defined categories based on at least one predetermined criterion.

10 Claims, 4 Drawing Sheets

METHOD FOR ASSOCIATING ADVERTISEMENTS WITH RELEVANT CONTENT

RELATED APPLICATIONS

Benefit is claimed under 35 U.S.C. 119(e) to U.S. Provisional Applications Ser. 60/883,822, entitled "Method for associating advertisements with relevant content" by Jayant Kadambi et al., filed on Nov. 19, 2007 which is herein incorporated in its entirety by reference for all purposes.

FIELD OF THE INVENTION

The present invention relates generally to advertising on Internet. More specifically, the present invention relates to a method and system for associating an advertisement with one or more content on Internet.

BACKGROUND OF THE INVENTION

In conventional methods, content published on Internet by publishers is available in uncategorized format. This makes it difficult for advertisers to select the websites or the content with which they want to place their advertisements. The advertisements of a company project the company's brand to customers. Companies may like to have a TV-like content channels category system to help them know on which Internet "channel" their advertisements are being placed. This is especially important for video advertisements, as the brand of a company is projected much more prominently to the customers with video advertisements as compared to textual advertisements. In some existing services, the content published on Internet by publishers may be categorized into some general web-based categories, for example, Open Directory (dmoz) categories or Yahoo directories based on the title and metadata associated with the content. The title and metadata associated with the content may be obtained using RSS (Really Simple Syndication or Rich Site Summary) feeds or Atom feeds. Further, advertising websites, such as www.tribalfusion.com, provide an advertiser with various channels to advertise in, for example, automotive, business, consumer electronics etc. However, any categorization of content on a website or other property based on semantics, metadata, references to other relevant documents on the property or website may not be relevant to the category listing that is preferred by advertisers.

Further, publishers may want to gauge the demand for their content in general and also in the specific domain in which they publish content. Also, advertisers may want to place their advertisements on the most popular websites. Such information may help in setting individual prices for advertisements placed with content published by the publishers. Moreover, publishers may also want to have access to information regarding the advertisements being placed by the advertisers. The information regarding advertisements may be the metadata associated with the advertisement.

Moreover, advertisers may find it difficult to find relevant content for their advertisements, as the content published on Internet by publishers is available in uncategorized format or in irrelevant categories. The content categorized into general web-based categories like Open Directory (dmoz) categories is not very useful for the advertisers. The publishers also do not have a method to gauge the demand for their content.

Therefore, there is a need for system and method that categorized content into categories that are understood by both the advertisers and the publishers; and hence allows for better information exchange between the advertisers and the publishers. Specifically, there is a need for content-based categorization of the content published on Internet by publishers, analogous to content-based categorization of TV channels, which is more relevant to the advertisers and publishers. Further, there is a need for method that provides demographic information about content on the Internet, such as a measure of content in specific categories, popularity of certain content, advertisements being placed by the advertisers, etc.

SUMMARY OF THE INVENTION

Various embodiments of the present invention provide method and system for associating advertisements with relevant content on Internet.

The above objective is achieved by providing a method that includes gathering one or more feeds associated with a content from a plurality of content on Internet. The content is then categorized into one or more general web-based categories based on the one or more feeds associated with the content. The one or more general web-based categories belong to a set of general web-based categories, which are translated to a set of pre-defined categories. Thus, a pre-defined category may have a collection of content belonging to one or more general web-based categories. This set of pre-defined categories is such that it is relevant to an advertiser as well as to a publisher. The advertisement can then be associated with the content in one or more pre-defined categories based on one or more predetermined criteria. The one or more predetermined criteria includes one or more of a relevance percentage corresponding to a plurality of content categorized into the set of pre-defined categories, an amount of content categorized in each pre-defined category, and a demographic data corresponding to a plurality of users viewing the plurality of content.

An embodiment provides a method and system for using feeds to categorize content on Internet into a set of pre-defined categories. An advertisement can then be associated with content in at least one pre-defined category in the set of pre-defined categories.

Yet another embodiment provides a method and system for deriving either contextual information from the advertisement or a keyword string obtained from an advertiser and associating the advertisement with content in at least one pre-defined category based on the contextual information or the keyword string.

Another embodiment of the invention allows a user to view the advertisement associated with a content either on a website or by downloading the content on the user's computing device.

Embodiments described above include a method and system for providing publishers of content with information regarding the set of pre-defined categories used to categorize the content on Internet, the amount of data in each category etc. The publishers may use the information for various purposes; for example, but not limited to, setting individual prices for advertisement slots placed along with their content and deciding the number of advertisement slots to be placed along with their content.

BRIEF DESCRIPTION OF THE DRAWINGS

The foregoing objects and advantages of the present invention method for associating advertisements with relevant content may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 1 illustrates a block diagram of an exemplary environment where various embodiments of the present invention can function in.

DETAILED DESCRIPTION OF THE DRAWINGS

Figure 1:
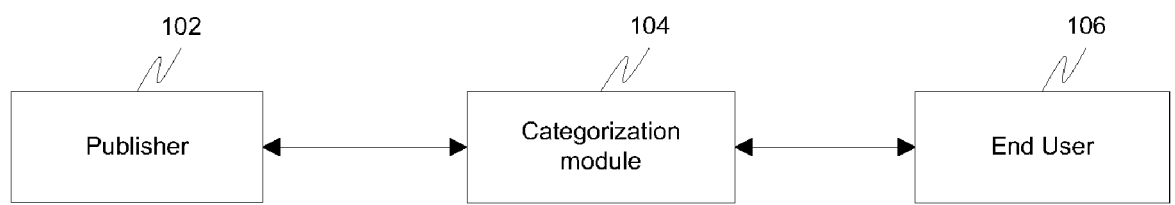

Before describing in detail embodiments that are in accordance with the present invention, it should be observed that the embodiments reside primarily in combinations of method steps and system components for associating advertisements with relevant content. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Relative terms such as first and second, top and bottom, and the like may be used solely to distinguish one entity or action from another entity or action without necessarily requiring or implying any actual such relationship or order between such entities or actions. The terms "comprises," "comprising," "has", "having", "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

Various embodiments provide method and system for categorizing content on Internet. In accordance with the present invention, feeds corresponding to content published on Internet are used to categorize the content into a set of pre-defined categories. Thereafter, an advertisement is associated with content in a pre-defined category in the set of pre-defined categories. Specifically, the feeds that are either user generated or professionally generated or both are used to categorize the content into a set of general web-based categories. This set of general web-based categories is mapped to a set of pre-defined categories, which is a cable or satellite TV-like content channels category system that makes it easy for an advertiser to understand.

Referring now to the drawings and in particular to FIG. 1, a block diagram showing an exemplary environment where various embodiments of the present invention can function in, is explained. A publisher 102 publishes feeds corresponding to a content on Internet. The feeds may be HTTP or web based feeds using RSS 2.0 or ATOM 1.0 formats. Those skilled in the art will appreciate that feeds may be published by a plurality of publishers including content viewers and professional publishers. A categorization module 104 obtains the feeds from publisher 102. Categorization module 104 may periodically poll publisher's websites for feed files corresponding to the content. Categorization module 104 categorizes the content published on Internet by publisher 102 into a set of general web-based categories. The set of web-based categories can be for example, but not limited to, Open Directory (dmoz) categories or Yahoo directories.

Categorization module 104 further translates the set of general web-based categories into a set of pre-defined categories. The translation is done such that one or more general web-based categories are translated (or mapped) to a pre-defined category. Thus, a pre-defined category includes one or more content from the one or more general web-based categories. In one embodiment, categorization module 104 provides information regarding the amount of data in each pre-defined category. Further, categorization module 104 may provide information on viewing habits, history, and other collected demographic data regarding the users who view advertisements and a plurality of content published on Internet.

An end user 106 may obtain information such as the set of pre-defined categories and the amount of content in each pre-defined category. End user 106 may be an advertiser. In one embodiment, the advertiser can select a pre-defined category from the set of pre-defined categories to associate an advertisement with, based on, for instance, a relevancy of associating the advertisement with each pre-defined category, a popularity of a content or a pre-defined category and the time of the day when certain content is viewed the most. The amount of content in each pre-defined category provides a measure of relevance of a pre-defined category. The amount of content in each category may be used to calculate the relevancy percentages. In another embodiment, the advertiser may submit the advertisement to categorization module 104. Categorization module 104 may, then, determine a pre-defined category to associate the advertisement with based on, for instance, a relevancy percentage and on demographic data regarding viewing habits of the users. Once an advertisement is associated with a content published on Internet, a content viewer viewing the content on the Internet, or viewing the content after downloading it on his communication device is also able to view the advertisement along with the content.

End user 106 may also be a publisher. The publisher may obtain information such as the set of pre-defined categories, the amount of data in each pre-defined category, demographic data about viewing habits of the users, from categorization module 104. This may assist the publisher in deciding about the number of ad-slots that it is providing to the advertisers, setting the prices for each ad slot, etc. For example, if demand for content is high, the publisher may increase the number of ad slots available to the advertisers.

Figure 2:
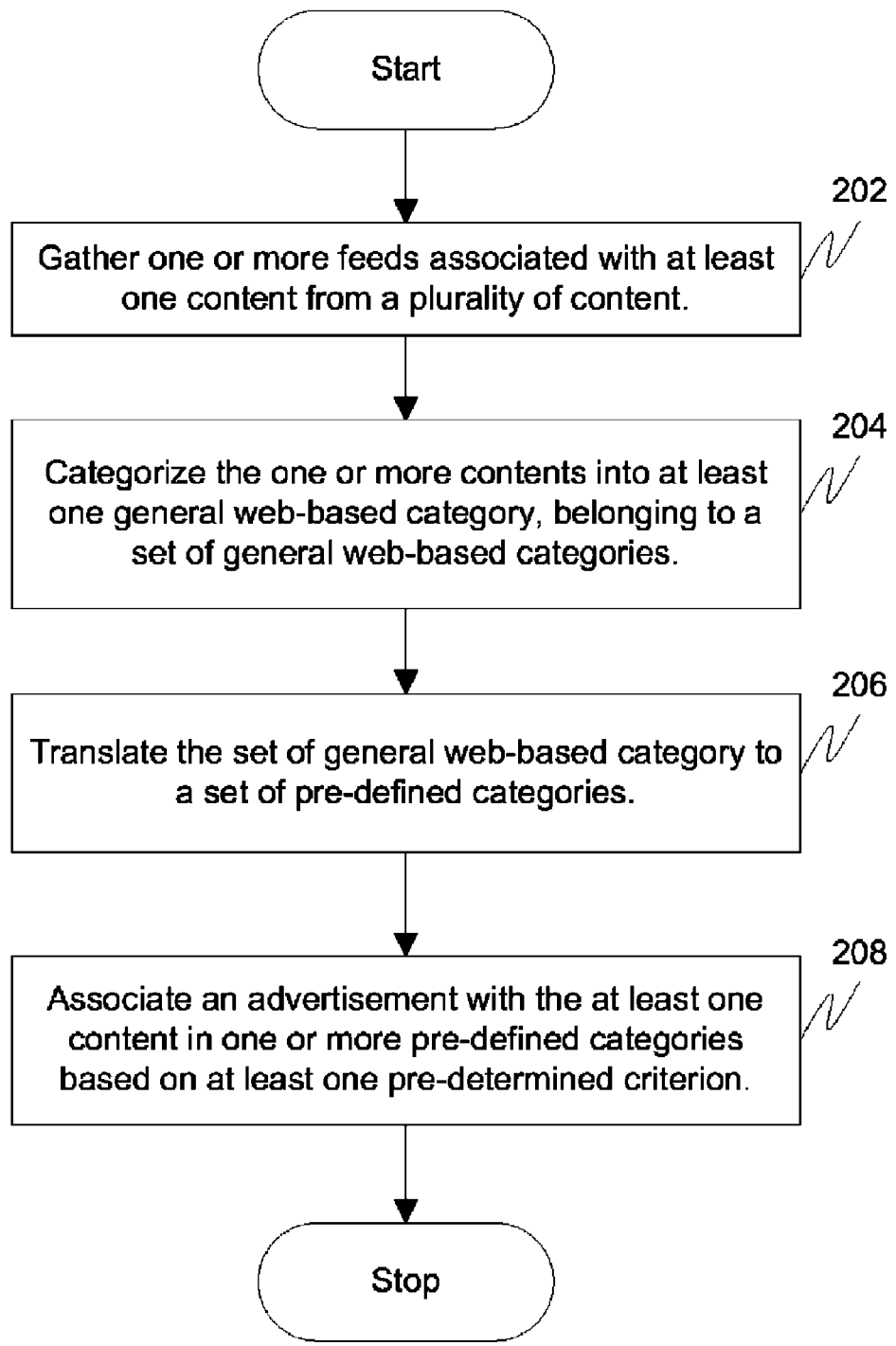
FIG. 2 illustrates a flow diagram of a method for categorizing content published on Internet so as to enable an advertiser to associate an advertisement with one or more content published on Internet, in accordance with an embodiment of the present invention.

FIG. 2 illustrates a flow diagram of a method for categorizing content published on Internet so as to enable an advertiser to associate an advertisement with one or more content published on Internet, in accordance with an embodiment of the present invention. One or more feeds associated with the one or more content published by publisher 102 of FIG. 1 are gathered at step 202. The one or more feeds may be HTTP or web feeds using RSS or ATOM formats. Publisher 102 may also include in the one or more feeds, a unique content ID for each piece of content along with content tags and content catalogue information. The one or more feeds may be gathered from the publishers' websites or from content aggregators. In an embodiment, a content provider or publisher 102 of the one or more content is constantly polled for new feeds corresponding to the one or more content.

Based on the one or more feeds gathered, categorization module 104 categorizes the one or more content published on Internet into a set of general web-based categories at step 204. The one or more feeds may be parsed to obtain a set of objects, which may then be used to categorize the one or more content into the set of general web-based categories. Further, the content tags and the content catalogue information provided by the publishers may also be used to categorize the one or more content into the set of general web-based categories. The set of general web-based categorizes may be the conventional categories provided by, for instance, Open Directory Project and the categories provided by Yahoo Directory.

It will be appreciated by those skilled in the art that the set of general web-based categories can be very general and may not be useful for advertisers. Thus, categorization module 104 translates the set of general web-based categories into a set of pre-defined categories at step 206. The information regarding the content and the set of general web-based categories in the set of pre-defined categories may be stored in a database.

Specifically, the set of general web-based categories is represented using a first hierarchical structure with many levels, for example a general web-based category "Top/arts/entertainment" has three levels. On the other hand, the set of predefined categories have a second hierarchical structure with at most a predetermined number of levels, for example a pre-defined category "Entertainment" has one level or may have at most two levels, such as "arts/entertainment". Thus, one or more general web-based categories may be mapped or translated to a single pre-defined category, which is more relevant to end user 106. For instance, a general web-based category "Top/Arts/Entertainment" and "Top/Shopping/Entertainment" can be translated to a predetermined category "Entertainment". Moreover, sub-categories of a general web-based category may be translated to a same pre-defined category. For instance, a general web-based category "Top/Arts/Entertainment" and its sub-category "Top/Arts/Entertainment/Reviews" may be translated to the pre-defined category "Entertainment".

Furthermore, if a general web-based category and its sub-category can be translated to different pre-defined categories, then it may have to be checked that translation of the sub-category occurs before the translation of the general web-based category. For instance, if a sub-category "Top/Arts/Entertainment/Online_Media/Search_Engine" can be translated to a pre-defined category "Internet", then it may be necessary to translate the sub-category before translating the general web-based category "Top/Arts/Entertainment" to the pre-defined category "Entertainment". This may be assured by sorting the order in which the set of general web-based categories is translated to the set of pre-defined categories such that the sub-categories are translated before their respective general web-based categories.

Additionally, there might be cases where no matching pre-defined categories for one or more general web-based categories are found. In such cases, manual translation may be carried out. In another embodiment of the present invention, the one or more general web-based categories, for which no matching pre-defined categories are found, may be translated into a pre-defined category called "Miscellaneous". The general web-based categories, which are in the "Miscellaneous" pre-defined category, can be periodically reviewed to decide if one or more new pre-defined categories can be formed from the "Miscellaneous" pre-defined category, for example "Miscellaneous" pre-defined category may be reviewed when it accumulates more than a predetermined threshold number of general web-based categories. Therefore, it will be appreciated by those skilled in the art that the set of pre-defined categories will change over time in accordance with the content that is being published on Internet. In an embodiment, the set of pre-defined categories may be changed automatically.

Further, in an embodiment, the content may be categorized into at least one pre-defined category based on a safety relevance. The safety relevance corresponds to a rating for content on Internet. For instance, the content can be given a safety rating like motion picture rating system in the United States, G (General Audiences—All ages admitted), PG (Parental Guidance Suggested), PG-13 (Parents Strongly Cautioned—Some material may be inappropriate for children under 13), R (Restricted—Persons under 16 are not admitted unless accompanied by parent or adult guardian), X (strong adult content—Persons under 17 not admitted). The safety rating may follow any other rating system, for example, a labeling system proposed and used by Internet Content Rating Association.

The set of pre-defined categories may be updated periodically and new pre-defined categories may be formed based on the changes in the set of general web-based categories. Once all the feeds and corresponding contents have been categorized, the information regarding amount of data in each category may be updated. An advertisement submitted by an advertiser is associated with one or more content in at least one pre-defined category at step 208. In an embodiment, the advertiser associates the advertisement with content in the at least one pre-defined category. In another embodiment, categorization module 104 selects one or more most relevant pre-defined categories with which the advertisement may be associated. The information regarding a relevance percentage of the at least one pre-defined category may be used for making the associations. Further, the advertiser may place the advertisement with content based on information regarding viewing habits, history, and other collected demographic data, regarding the users who views the content published on Internet. The advertiser may select more than one pre-defined category for advertising. Therefore, the method provides advertisers with TV-like content channels to help them know where their advertisements will be placed. The advertiser may also select time at which the advertisement is placed with appropriate content from the selected pre-defined categories. Further, the advertiser may also choose the time duration for which advertisement is placed with the relevant content. Furthermore, the advertiser may associate advertisement with content in one or more pre-defined categories based on safety ranking or safety relevance.

Figure 3:
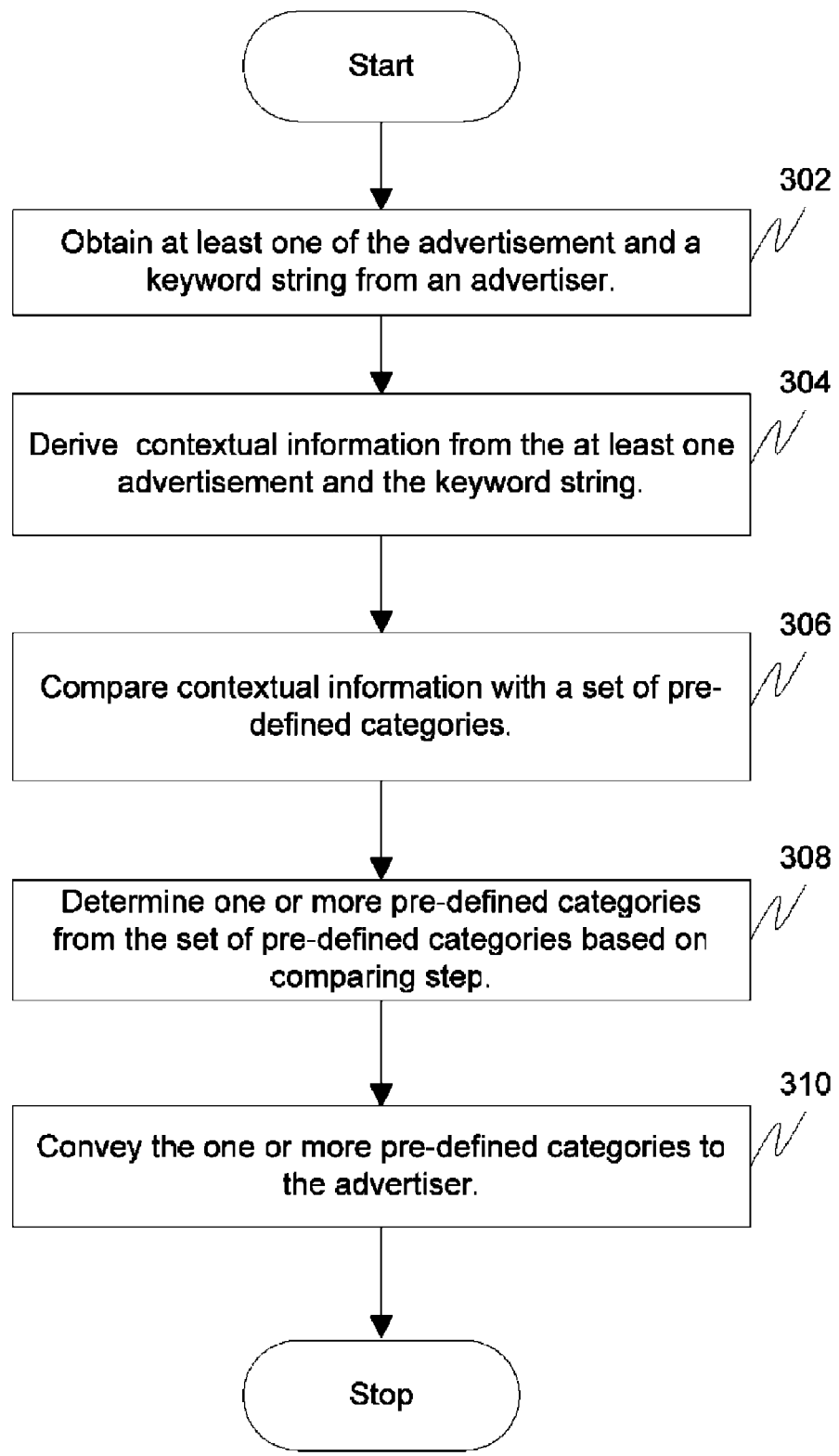
FIG. 3 illustrates a flow diagram of a method for associating an advertisement with one or more content published on Internet, in accordance with an embodiment of the present invention.

FIG. 3 illustrates a flow diagram of a method for associating an advertisement with one or more content published on Internet, in accordance with an embodiment of the present invention. An advertisement to be placed with relevant content on Internet is obtained from an advertiser at step 302. Further, a keyword string corresponding to the advertisement may also be obtained from the advertiser. The advertisement or the keyword string or both are used to derive contextual information regarding the advertisement at step 304. Thereafter, the contextual information is compared with a set of pre-defined categories at step 306. In another embodiment of the present invention the contextual information is compared with a set of general web-based categories, which are then translated to the set of pre-defined categories. Based on the comparison at step 306, at least one pre-defined category is determined which is relevant to the advertisement at step 308. The at least one pre-defined category may be determined based on, for instance, a relevance percentage, safety relevance, a demographic data corresponding to the at least one pre-defined category, etc. Finally, the at least one pre-defined category may be conveyed to the advertiser at step 310. Those skilled in the art will realize that a user interface at the advertiser may convey the at least one pre-defined category or a relevance percentage associated with the set of pre-defined categories. The advertiser may select one or more content in the at least one pre-defined category along with which the advertisement may be placed. Also, an appropriate time for the advertisement may be specified by the advertiser based on the viewing habits of the users. The advertisement may also be placed with appropriate content on Internet on the basis of the information regarding amount of data in each category. Once the advertisement is placed with a content published on Internet, a content viewer viewing the content on the Internet, or viewing the content after downloading it on his communication device is also able to view the advertisement along with the content.

In another embodiment of the present invention, the publishers may obtain information about the popular pre-defined categories used, the amount of data in each pre-defined category, etc. The publishers may use this information for setting individual prices for advertisements placed with the content published by them based on demand and content. Further, publisher may use this information for deciding the number of ad slots that may be provided to the advertisers. Also, the publishers or one or more content aggregators may use the contextual information associated with one or more advertisements and statistics related to placing of one or more advertisements for improving the information pertaining to the content tags and content catalogue information corresponding to their content. In an embodiment of the present invention, the publishers and one or more content aggregators may be provided with a subscription to an incentive plan, which rewards them for an appropriate categorization of their content. Wherein the appropriate categorization of their content facilitates ease of placing advertisement with a corresponding relevant content, which in turn results in improved monetization.

Figure 4:
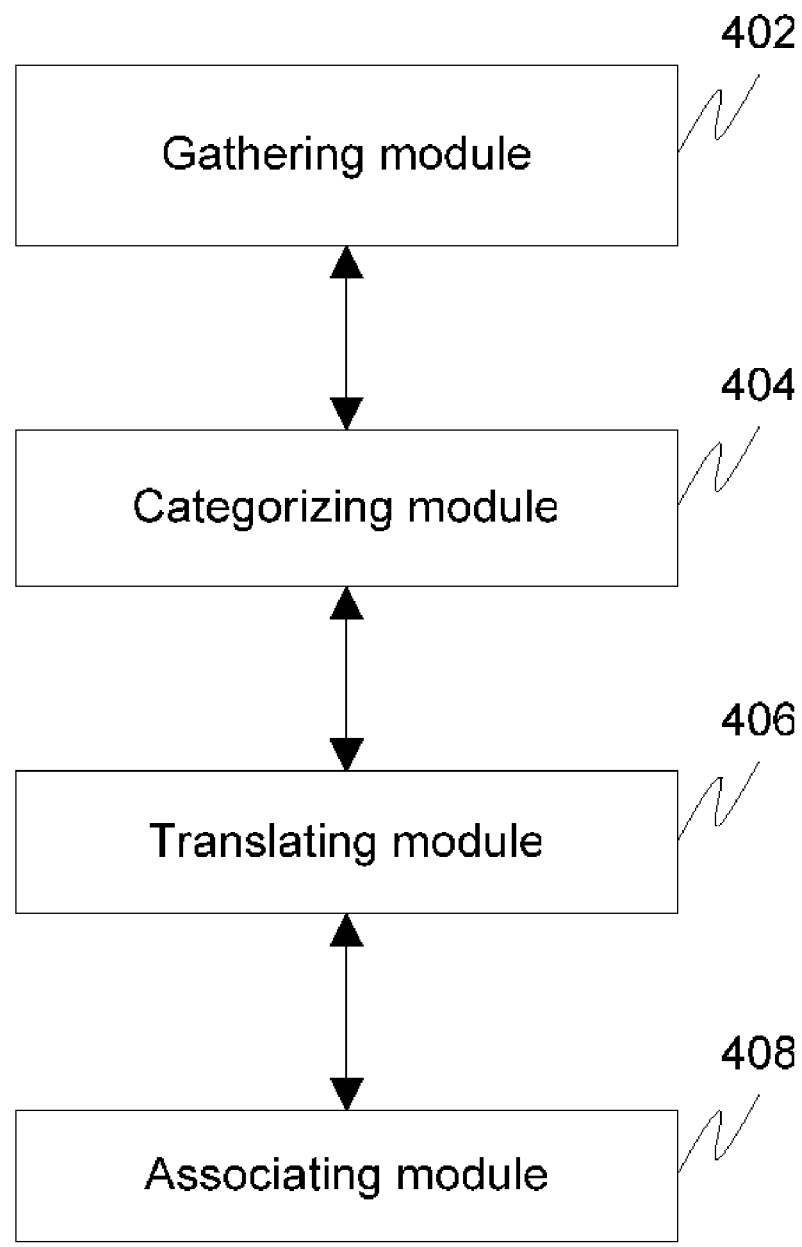
FIG. 4 illustrates a block diagram of a system for associating an advertisement with one or more content published on Internet, in accordance with an embodiment of the present invention.

FIG. 4 illustrates a block diagram of a system for associating an advertisement with one or more content published on Internet, in accordance with an embodiment of the present invention. The system includes a Gathering module 402, a Categorizing module 404, a Translating module 406 and an Associating module 408. One or more publishers or content aggregators may publish one or more content on Internet. The one or more publishers or content aggregators may further associate one or more feeds with the one or more content. As mentioned before, the one or more feeds can be http or web feeds using RSS or ATOM. Gathering module 402 gathers the one or more feeds associated with a content published on Internet. Gathering module 402 can gather feeds associated with the content on a periodic basis.

Categorizing module 404 receives the one or more feeds from Gathering module 402 and categorizes the content associated with the one or more feeds into a set of general web-based categories. Translating module 406 translates the set of general web-based categories to a set of pre-defined categories. As mentioned earlier, the set of general web-based categories is represented using a first hierarchical structure with many levels, for example a general web-based category "Top/arts/entertainment" has three levels. On the other hand, the set of predefined categories have a second hierarchical structure with at most a predetermined number of levels, for example a pre-defined category "Entertainment" has one level or may have at most two levels, such as "arts/entertainment". Thus, one or more general web-based categories may be mapped or translated to a single pre-defined category, which is more relevant to the advertiser.

Finally, Associating module 408 receives the advertisement from the advertiser to be placed with relevant content categorized into the set of pre-defined categories. Associating module may extract a contextual information from the advertisement or from a keyword string provided by the advertiser. Based on the contextual information, Associating module 408 may automatically associate the advertisement with either one or more pre-defined categories or with one or more content in a pre-defined category. Associating module 408 may associate the advertisement based on, for instance, a relevance percentage, a safety relevance or a demographic data corresponding to the set of pre-defined categories. In an embodiment, Associating module 408 may convey one or more pre-defined categories or, one or more content in a pre-defined category that are most relevant to the advertisement. Thereafter, the advertiser may manually associate the advertisement with one or more content on Internet.

Various embodiments of the present invention provide methods and systems for associating an advertisement with at least one content on Internet. The system gathers feeds corresponding to the at least one content published on Internet and categorizes the at least one content into a set of general web-based categories. Therefore, the categorization of the at least one content is kept up to date. Thereafter, the set of general web-based categories is translated to a set of pre-defined categorizes. The set of pre-defined categories is more relevant to the advertisers as compared to the set of general web-based categories. Finally, at least one advertisement is associated with at least one pre-defined category or one or more content in the at least one pre-defined category, either manually or automatically. Further, a content viewer can view the at least one advertisement along with the content even if the content is downloaded on the content viewer's communication device. Thus, the present invention provides a method to place advertisements with relevant content on Internet. Further, various embodiments of the present invention provide methods that place advertisements on Internet based on, for instance, but not limited to, a relevance percentage, a safety relevance and a demographic data.

In the foregoing specification, specific embodiments of the present invention have been described. However, one of ordinary skill in the art appreciates that various modifications and changes can be made without departing from the scope of the present invention as set forth in the claims below. Accordingly, the specification and FIGS. are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for associating an advertisement with at least one content on Internet, the method comprising:

gathering one or more feeds associated with at least one content from a plurality of content;

categorizing the at least one content into at least one general web-based category, the at least one general web-based category belonging to a set of general web-based categories, wherein the at least one content is categorized based on the one or more feeds associated with the at least one content; translating the set of general web-based categories to a set of pre-defined categories, wherein one or more general web-based categories from the set of general web-based categories are translated to a pre-defined category in the set of pre-defined categories;

associating the advertisement with the at least one content in one or more pre-defined categories from the set of pre-defined categories based on at least one predetermined criterion; and wherein the categorizing step comprises providing a relevance percentage corresponding to the at least one content categorized into each of the at least one general web-based category.

2. The method of claim 1, wherein the associating step comprises at least one of:

associating automatically the advertisement with the at least one content based on the at least one predetermined criterion; and associating manually the advertisement with the at least one content based on the at least one predetermined criterion.

3. The method of claim 1, wherein the at least one predetermined criterion comprises at least one of:

a relevance percentage corresponding to a plurality of content categorized into the set of pre-defined categories; an amount of content categorized in each pre-defined category in the set of pre-defined categories; and a demographic data corresponding to a plurality of users viewing a plurality of contents in the set of pre-defined categories.

4. The method of claim 3, wherein the demographic data comprises at least one of a number of hits received by the plurality of contents and one or more timeslots when the plurality of contents receives at least a threshold number of hits.

5. The method of claim 1, wherein the gathering step further comprising polling a content provider of the at least one content for at least one new feed corresponding to the at least one content.

6. The method of claim 1, wherein the one or more feeds are obtained in at least one of a RSS 2.0 format and an ATOM 1.0 format.

7. The method of claim 1, wherein the set of general web-based categories is at least one of a set of Open Directory (dmoz) categories and a set of Yahoo directory categories.

8. The method of claim 1, wherein the set of general web-based categories is represented using a first hierarchical structure and the set of pre-defined categories is represented using a second hierarchical structure, the second hierarchical structure comprising at most a predetermined number of levels.

9. The method of claim 1, wherein the translating step comprises a manual translation of one or more general web-based categories to one or more predefined categories, if a translation of the one or more general web-based categories to each pre-defined category in the set of pre-defined categories is absent.

10. The method of claim 1, wherein the translating step comprises translating one or more general web-based categories to a miscellaneous category, if a translation of the one or more general web-based categories to each pre-defined category in the set of pre-defined categories is absent, the miscellaneous category belonging to the set of pre-defined categories.

* * * * *